April 16, 1940.   J. H. DORAN   2,197,631
KEYED SHAFT STRUCTURE
Filed April 1, 1938
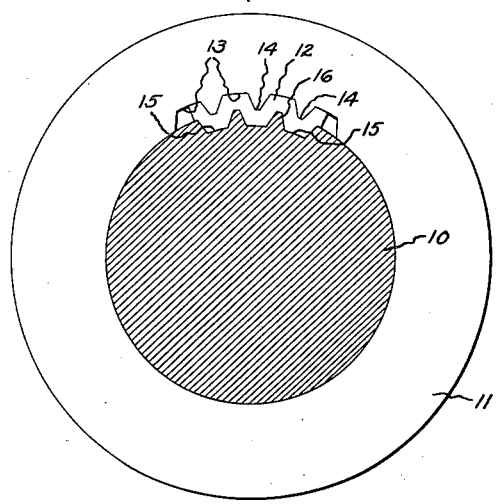
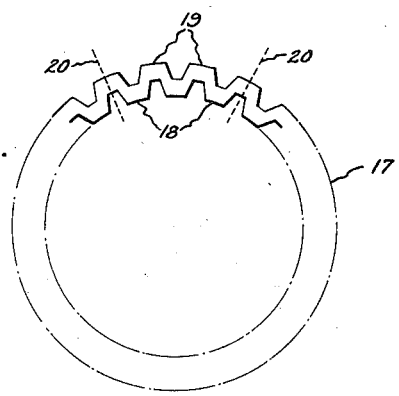
Inventor:
John H. Doran,
by Harry E. Dunham
His Attorney.

Patented Apr. 16, 1940

2,197,631

UNITED STATES PATENT OFFICE 2,197,631

KEYED SHAFT STRUCTURE

John H. Doran, Scotia, N. Y., assignor to General Electric Company, a corporation of New York Application April 1, 1938, Serial No. 199,465

3 Claims. (Cl. 287—52.05)

The present invention relates to keyed shaft structures comprising a shaft and a disk or like element rigidly secured to the shaft by means of a key or keys. In such structures the size and number of keys depends upon the torque to be transmitted from the shaft to the disk or, vice versa, from the disk or the like element to the shaft.

The object of my invention is to provide an improved construction and arrangement of keyed shaft structures.

For a consideration of what I believe to be novel and my invention, attention is directed to the following description and the claims appended thereto in connection with the accompanying drawing.

In the drawing, Fig. 1 illustrates a keyed structure embodying my invention; Fig. 2 is an explanatory view with regard to the method of making keys in accordance with my invention; and Fig. 3 represents a modification of the key structure and the method of making it.

The arrangement shown in Fig. 1 comprises a shaft 10 and a disk 11 secured to the shaft by a key 12. The disk 11 has a cylindrical bore fitting the shaft 10. A section of the cylindrical bore of the disk is machined to form a plurality of grooves 13 defining teeth 14 between them. The shaft 10 has similar grooves 15 defining teeth 16 between them. The grooves in the shaft and disk elements extend over a short arc only. When assembled, the teeth of the shaft lie opposite the grooves in the disk and the teeth of the disk lie opposite the grooves in the shaft, thus defining a key space. The key 12 located in the space is broadly of corrugated shape. This key may be produced by forging or rolling. Where great accuracy is concerned, it is preferably machined from a cylindrical ring 17, as shown in Fig. 2. The inner and outer surfaces of the ring are machined to form teeth 18 and 19 respectively. The spacing between adjacent teeth is approximately twice the width of the individual tooth and the teeth on the inner surface are located opposite the grooves formed in the outer surface. After the cylindrical ring 17 is thus machined, it is cut into segments of suitable length, as indicated by dotted lines 20. The length of the segment depends upon the torque to be transmitted. Thus, when it becomes necessary in a certain case to transmit a torque twice as great as the torque transmitted in another case, all that is necessary in the first case is to select a key twice the number of teeth of the key in the second case. Thus, my invention permits to a considerable extent standardization of keyed shaft structures.

The key structure shown in Fig. 3 comprises a flat plate 22 with a plurality of equally spaced parallel grooves 23 and 24 on opposite sides. Adjacent grooves define teeth and the location of the grooves on opposite sides is so that a tooth on one side is always located opposite a groove on the other side so that the grooved plate assumes a corrugated shape. An important feature of this arrangement is the fact that the grooves 24 on the upper side are considerably deeper than the grooves 23 on the lower side in order to reduce the thickness of the teeth on the lower side and thereby to produce bending points 25 to permit bending of the grooved plate. Such flat keys may be manufactured at comparatively low cost.

What I claim as new and desire to secure by Letters Patent of the United States is:

1. Key structure for securing a disk or like element to a shaft comprising a flat plate having a plurality of parallel grooves cut into opposite sides to define teeth with each groove on one side located opposite a tooth on the other side, the grooves on one side being considerably deeper than those on the other side to permit bending the grooved plate.

2. Keyed shaft structure comprising an element having a cylindrical surface, another element with a cylindrical bore having a circumferential portion fitting the cylindrical surface of the first element, short arcs of the elements having a plurality of parallel grooves defining together a corrugated space, and a corrugated key located in said space and rigidly connecting the elements.

3. Keyed shaft structure comprising a shaft having a circumferential portion with a plurality of grooves defining teeth between them, an element with a cylindrical bore having a portion along the circumference of the bore grooved to form teeth opposite the grooves of the shaft, the other portion along the bore fitting the shaft, and corrugated key means filling the space formed by the grooves rigidly to lock the element to the shaft.

JOHN H. DORAN.